Patented Dec. 27, 1932                                                    1,892,205

UNITED STATES PATENT OFFICE

MELVIN DE GROOTE, OF ST. LOUIS, MISSOURI, ASSIGNOR, BY MESNE ASSIGNMENTS, TO TRETOLITE COMPANY, OF WEBSTER GROVES, MISSOURI, A CORPORATION OF MISSOURI

PROCESS FOR PREVENTING ACCUMULATION OF SOLID MATTER IN OIL WELLS, PIPE LINES AND FLOW LINES

No Drawing.          Application filed February 23, 1926. Serial No. 90,141.

This invention relates to a process that is intended to be used to prevent the accumulation of solid matter in oil wells and pipe lines that are producing or which contain "non-cutting oil", or a mixture of such oil and brine, i. e., oil that is either anhydrous or which does not have emulsifying properties or a tendency to emulsify while it is traveling upwardly through the casing of the well or traveling through the flow line.

In many oil wells in which liquid consisting of non-cutting oil or a mixture of such oil and water is produced, deposits of paraffin, wax, asphalt, sand, insoluble alkaline earth compounds and other solid materials collect in objectionable quantities on the well tubing, on the casing, on the inside of the strainer and in the working barrel of the well pump, thereby causing the production of the well to be materially decreased. Some or all of these materials also accumulate in oil lines or conduits through which liquids of the kind mentioned travel, such, for example, as surface lines connected to wells and the pipe lines through which oil is transported from oil fields. The presence of these deposits of solid material necessitates cleaning out the wells and oil lines at more or less frequent intervals, in order to maintain production of wells and capacity of flow lines or pipe lines.

I have discovered that such cleaning operations can be eliminated if liquid comprising non-cutting oil located at the bottom of a substantially clean well or at the entrance of a substantially clean oil line, such as a flow line or pipe line, is subjected to such treatment as to cause the undesirable solid materials in said liquid to be held in solution, suspension or dispersion, i. e., in a non-flocculated condition, so that they will escape from the well or travel through the oil line without liability of becoming deposited on the pumping equipment in the well or on the interior of the oil line. Accordingly, I claim to be the originator or discoverer of a simple process for keeping an oil well or an oil line of the kind previously mentioned in operative condition. My process is restricted to use with wells that are producing liquids of the kind described and oil lines through which such liquids are flowing, and the process consists in introducing into the bottom of such a producing well, or introducing at the entrance of such a flowing oil line, a deflocculent agent, in water-soluble or oil-soluble form, which is of such a character or nature that it will cause paraffin, wax, asphalt, sands, inorganic soluble compounds, or other solid materials in the non-cutting oil or in the water that is produced with the oil, to be held in a non-flocculated condition, thereby eliminating the possibility of said solid materials becoming deposited at points where they will interfere with the oil from the well or through the flow line.

The soluble deflocculent agent contemplated by my process consists of or comprises a modified fatty acid or modified detergent-forming material of the kind used extensively in the resolution of water-in-oil emulsions, as disclosed in the following United States patents: Nos. 1,467,831, Barnickel, Sept. 11, 1923, 1,595,457, De Groote et al., Aug. 10, 1926, 1,596,590, De Groote, Aug. 17, 1926, 1,596,593, De Groote et al., Aug. 17, 1926, 1,596,594, De Groote et al., Aug. 17, 1926, 1,641,804, De Groote et al., Sept. 6, 1927, 1,656,622, De Groote et al., Jan. 17, 1928, 1,656,623, De Groote et al., Jan. 17, 1928.

The materials or substances which I have found to be most valuable as the treating agent of my process are modified fatty materials, modified fatty acids, petroleum sludge soaps, modified detergent-forming materials, such as modified naphthenic acid, modified rosin and the salts and esters of the above specified materials. I have found especially desirable those condensation products which contain a modified detergent-forming group, an aromatic and a sulfonic group. The substances employed may be both oil and water-soluble, or I may use a compound, part of which is oil-soluble and part water-soluble. Accordingly, in practising my process I use a deflocculent agent consisting of one or more of the materials above mentioned, and in order that the soaps of my invention will be clearly defined, I have used in the claims the expression "deflocculent agent of the class described" to mean those particular materials herein specified as being suitable for use in my process, the term "soluble agent" being herein used to mean an agent that is soluble with at least one of the liquids with which it comes in contact.

The deflocculent agent can be introduced into the well or into the oil line in any suitable manner, as, for example, by pouring it down the casing or tubing of a producing well or by pouring it into a flowing oil line adjacent the point where the oil enters the same, it only being necessary to use a very minute quantity of the deflocculent agent, due to the fact that the only function which said deflocculent agent is intended to perform is to hold the objectionable solid materials in solution, suspension or dispersion.

I am aware of the fact that U. S. Patent No. 1,531,733 to J. D. Brady, dated March 24, 1925, describes a process that contemplates introducing a water-softening agent or other suitable treating agent into an oil well for the alleged purpose of preventing the formation of hydrocarbon emulsions, and I am also aware of the fact that in the commercial use of the "Tret-O-Lite" process for breaking water-in-oil emulsions the treating agent is sometimes mixed with the emulsion by introducing the treating agent into the line through which the emulsion is flowing from the well to the settling tank. Both of said processes are restricted, however, to use with "cut oils", "roily oils" and similar water-in-oil emulsions and are not intended to be used in connection with non-cutting oil, i. e., oil which is of such a character that it will not "cut" or produce a water-in-oil emulsion. Nor are said processes intended to be used on pipe line oil in the absence of water. Hence, my process is distinguished from the said Brady process and "Tret-O-Lite" process in two respects:

(1st) It is not intended to be used in connection with oil which is of such a character that it will "cut" or produce a water-in-oil emulsion; and (2nd) It is used for the purpose of preventing solid materials, such as paraffin, wax, asphalt and other inorganic, insoluble compounds that are mixed with non-cutting oil and the water that is produced with such oil, from collecting in objectionable quantities on the pumping equipment in an oil well or on the interior of an oil line, such as a surface flow line or pipe line through which non-cutting oil is traveling.

I am aware of the fact that United States patent to A. C. Campbell, No. 1,513,371, dated October 28, 1924, discloses a process for removing deposits from pipe lines used for conveying crude oil, that contemplates passing through the pipe line a composition consisting of soda ash, sal soda, sodium bicarbonate and naphtha mixed with water, so as to dissolve the sediment and heavy oily matter which has collected on the inner surface of the pipe line, but the sole function of said process is to clean or effect the removal of deposits from pipe lines that are in a dirty condition or partially clogged condition. My process is entirely different, and not only is not intended to be used for the same purpose as the Campbell process, but is not capable of accomplishing the same result as the Campbell process. In my process the agent that is introduced into a well or into a flow line will not dissolve deposits of solid matter that have collected on the inner surface of the well tubing or flow line, and thus effect the removal of said deposits. On the contrary, in my process it is necessary to start with a flow line or producing well that is clean or substantially free from deposits of solid matter, and the result attained by the agent that is introduced into the well or flow line is to keep the solid mater in the water or oil in a non-flocculated condition, thereby preventing said solid matter from collecting on the inner surface of the well tubing or flow line.

A further distinction between my process and the Campbell process is that the agent used by the Campbell process must necessarily be introduced into a flow line when the line is not being used for conveying crude oil, due, of course, to the fact that the sole purpose of the process is to clean out the line, whereas, in my process the agent is, in most instances, introduced into a well that is in pumping operation or introduced into a flow line through which oil is flowing, due to the fact that the function performed by the agent is to keep, hold or maintain the solid matter in such a condition that it will not adhere to or collect on the well tubing or flow line, and thus retard the travel of the fluid through the same.

Having thus described my invention, what I claim as new and desire to secure by Letters Patent is:

1. A process for preventing the accumulation of solid matter in an oil well or pipe line, characterized by introducing into a substantially clean producing well or oil flowing line that is producing or which contains liquid comprising non-cutting oil, a minute quantity of a soluble deflocculent agent containing a modified organic detergent-forming material, for holding the suspended solid material in said liquid in a non-flocculent condition.

2. A process for preventing the accumulation of solid matter in an oil well or pipe line, characterized by introducing into a substantially clean producing well or flowing oil line that is producing or which contains liquid comprising non-cutting oil, a minute quantity of a soluble deflocculent agent, containing a water-soluble salt of a modified fatty material, for holding the suspended solid material in said liquid in a non-flocculent condition.

3. A process for preventing the accumulation of solid matter in an oil well or pipe line, characterized by introducing into a substantially clean producing well or flowing oil line that is producing or which contains liquid comprising non-cutting oil, a minute quantity of a soluble deflocculent agent, containing an ammonium salt of a modified fatty material, for holding the suspended solid material in said liquid in a non-flocculent condition.

MELVIN DE GROOTE.